United States Patent
Lo Presti

(10) Patent No.: US 12,187,244 B2
(45) Date of Patent: *Jan. 7, 2025

(54) TIRE PRESSURE MAINTENANCE APPARATUS AND METHOD

(71) Applicant: Leonhard LLC, Dulles, VA (US)

(72) Inventor: Michael Anthony Lo Presti, Potomac Falls, VA (US)

(73) Assignee: Leonhard LLC, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/213,944

(22) Filed: Jun. 26, 2023

(65) Prior Publication Data

US 2024/0034283 A1 Feb. 1, 2024

Related U.S. Application Data

(60) Continuation of application No. 17/498,157, filed on Oct. 11, 2021, now Pat. No. 11,724,671, which is a continuation of application No. 16/939,002, filed on Jul. 26, 2020, now Pat. No. 11,142,171, which is a division of application No. 15/858,687, filed on Dec. 29, 2017, now Pat. No. 10,773,692.

(60) Provisional application No. 62/440,703, filed on Dec. 30, 2016.

(51) Int. Cl.
*B60S 5/04* (2006.01)

(52) U.S. Cl.
CPC ..................................... *B60S 5/046* (2013.01)

(58) Field of Classification Search
CPC ......... B60S 5/043; B60S 5/046; Y10T 137/36
See application file for complete search history.

(56) References Cited

U.S. PATENT DOCUMENTS

| | | | | |
|---|---|---|---|---|
| 5,587,698 A * | 12/1996 | Genna | ............... | B60C 23/00363 152/417 |
| 6,144,295 A * | 11/2000 | Adams | ............... | B60C 23/00354 137/224 |
| 6,499,343 B1 * | 12/2002 | Haas | ........................ | B60S 5/046 73/146 |
| 6,888,446 B2 * | 5/2005 | Nantz | .................... | B60C 23/045 340/539.23 |
| 7,154,414 B2 * | 12/2006 | King | .................... | B60C 23/0416 73/146 |
| 7,197,422 B2 * | 3/2007 | Gaunt | ...................... | B60C 23/04 73/146.2 |
| 7,706,930 B2 * | 4/2010 | Corniot | ............... | B60C 23/0408 701/1 |
| 10,500,906 B2 * | 12/2019 | Chidlow | ............. | B60C 23/0408 |
| 10,906,545 B2 * | 2/2021 | Seaman | ................ | B60W 10/30 |
| 11,548,332 B2 * | 1/2023 | Fischer | .................... | G07C 5/08 |
| 11,724,671 B2 * | 8/2023 | Lo Presti | ................ | B60S 5/046 137/224 |

(Continued)

*Primary Examiner* — Reinaldo Sanchez-Medina
(74) *Attorney, Agent, or Firm* — Lieberman & Brandsdorfer, LLC

(57) ABSTRACT

An air pressure maintenance apparatus and method uses one or more high-pressure gas storage tanks coupled to an inflation hose via a calibrated rigid measurement chamber and automated system of valves to permit rapid inflation of a tire or other inflatable device to an accurate target pressure accounting for temperature effects, and recording accurate pre- and post-inflation pressure for analysis of deflation over time.

14 Claims, 7 Drawing Sheets

(56) References Cited

U.S. PATENT DOCUMENTS

2015/0047740 A1* 2/2015 Lawson .................. B60S 5/043
                                                            141/83
2016/0303924 A1* 10/2016 Mazor ...................... G07C 5/08

* cited by examiner

TIRE PRESSURE MAINTENANCE APPARATUS AND METHOD

CROSS-REFERENCE TO RELATED APPLICATIONS

This application is a continuation of U.S. application Ser. No. 17/498,157, filed Oct. 11, 2021, which is a continuation of U.S. application Ser. No. 16/939,002, filed Jul. 26, 2020, now U.S. Pat. No. 11,142,171, which is a divisional of U.S. application Ser. No. 15/858,687, now U.S. Pat. No. 10,773,692, filed Dec. 29, 2017, which claims priority to U.S. Provisional Application No. 62/440,703 filed on Dec. 30, 2016, the entire content of each application is incorporated herein by reference.

BACKGROUND OF THE INVENTION

This invention generally relates to automobile tire pressure maintenance.

The basis of this invention was conceived by the inventor after experiencing a tire blow-out at 60 MPH on a crowded highway in a pickup truck pulling a 4,000 pound boat. Failure was likely due to under-inflation and rising tire temperatures, traveling at speed, on a hot summer day.

The tires for this vehicle required 80 pounds per square inch (PSI) pressure, which was very difficult to maintain since common compressor-based air filling stations cannot meet this pressure demand. These compressor-based systems are also highly inaccurate, provide no means of recordation of pressure, and are difficult to use.

As a result of the tire failure, the inventor recognized that current tire inflation technology that is commercially available to the general public was inadequate for such a critical safety component of the automobile driving experience. Further, there is little technology available to the average vehicle owner and operator that promotes proper tire maintenance and monitoring of deflation patterns for tire problem detection.

The economics in favor of proper tire inflation are compelling; the relative low cost of properly maintaining tire pressure results in significant fuel savings and reduced tire wear resulting in an economic financial benefit estimated at 8% or better return on investment. Studies report that about 0.4% fuel savings can be achieved for each 1 PSI a tire is underinflated. Although there is no accurate public data available for the average under-inflation of tires, the inventor's preliminary research indicates the average under-inflation of passenger cars is 5 to 6 PSI. Thus, fuel economy can typically be improved by 2-3% through proper tire inflation. Further, this economic advantage does not account for the reduction in deaths, injury and property damage from the reduction in tire-inflation related accidents.

BRIEF SUMMARY OF THE INVENTION

The object of the invention is to solve the issues with the prior art identified above, to create an apparatus and method that enables rapid and accurate automated tire pressure maintenance capable of supplying high tire pressures when needed, generating certified tire pressure statements, and recording tire pressure for historical analysis of tire-specific pressure loss over time.

The tire pressure maintenance apparatus and method of the present invention comprises a high-pressure gas tank coupled to a tire inflation nozzle having an air temperature measuring device. Release of stored gas from the tank through the nozzle is controlled by a computer receiving gas pressure and optionally temperature data from calibrated sensors and controlling a set of gas valves to accurately inflate a tire according to tire manufacturer or use specifications. The computer can optionally be networked for data archiving and analysis, and the system can generate a certified tire pressure statement.

One embodiment of the invention is an apparatus having a compressed gas tank, an inflation valve controlling release of the compressed gas from the tank, a measurement chamber with an input port receiving the compressed gas from the tank through the first inflation valve, an output port, and a pressure sensor measuring gas pressure within the measurement chamber. The apparatus also has a deflation valve controlling the release of gas from the otherwise enclosed interior of the apparatus to the external atmosphere, an air chuck engaging an inflation valve of a tire or other inflatable object to permit fluid communication between the output port and the interior of the inflatable object, and a controller such as a microprocessor that opens the inflation valve when the gas pressure in the inflatable object is less than a target pressure, and opens the deflation valve when the gas pressure in the inflatable object is greater than the target pressure.

In another embodiment, the invention is an apparatus having a compressed gas tank, an air chuck in fluid communication with the tank via an enclosed conduit for engaging an inflation valve of the inflatable object to permit fluid communication between the tank and an interior of the inflatable object, a pressure sensor detecting a gas pressure within the enclosed conduit, a first inflation valve controlling fluid communication in the enclosed conduit between the tank and the pressure sensor, a second inflation valve controlling fluid communication in the enclosed conduit between the tank and the pressure sensor in serial with the first inflation valve where the first inflation valve is disposed between the tank and the second inflation valve, and a controller sequentially performing the steps of (1) closing the first inflation valve and opening the second inflation valve, (2) receiving the gas pressure from the pressure sensor as an initial pressure when the air chuck engages an inflatable object to permit inflation communication between the interior and the enclosed conduit, (3) sending an opening signal to open the first inflation valve, (4) waiting for a time period calculated to cause the gas pressure within the enclosed conduit and the inflatable object to increase to a desired pressure according to a tank pressure in the tank, the initial pressure, and a known delay between sending a closing signal to the second valve and the second valve fully closing, and (5) immediately sending the closing signal to the second valve after waiting for the calculated time period, whereby the second valve closes before the first inflation valve would be physically capable of closing.

DETAILED DESCRIPTION OF THE INVENTION

Throughout this specification, reference is made to inflation of a tire. However, this is merely for convenience, and the disclosure is not limited to use only with tires; use of the apparatuses and methods described herein to inflate any inflatable object in addition to tires and inner tubes, such as inflatable recreational equipment, is contemplated.

Figure 1:
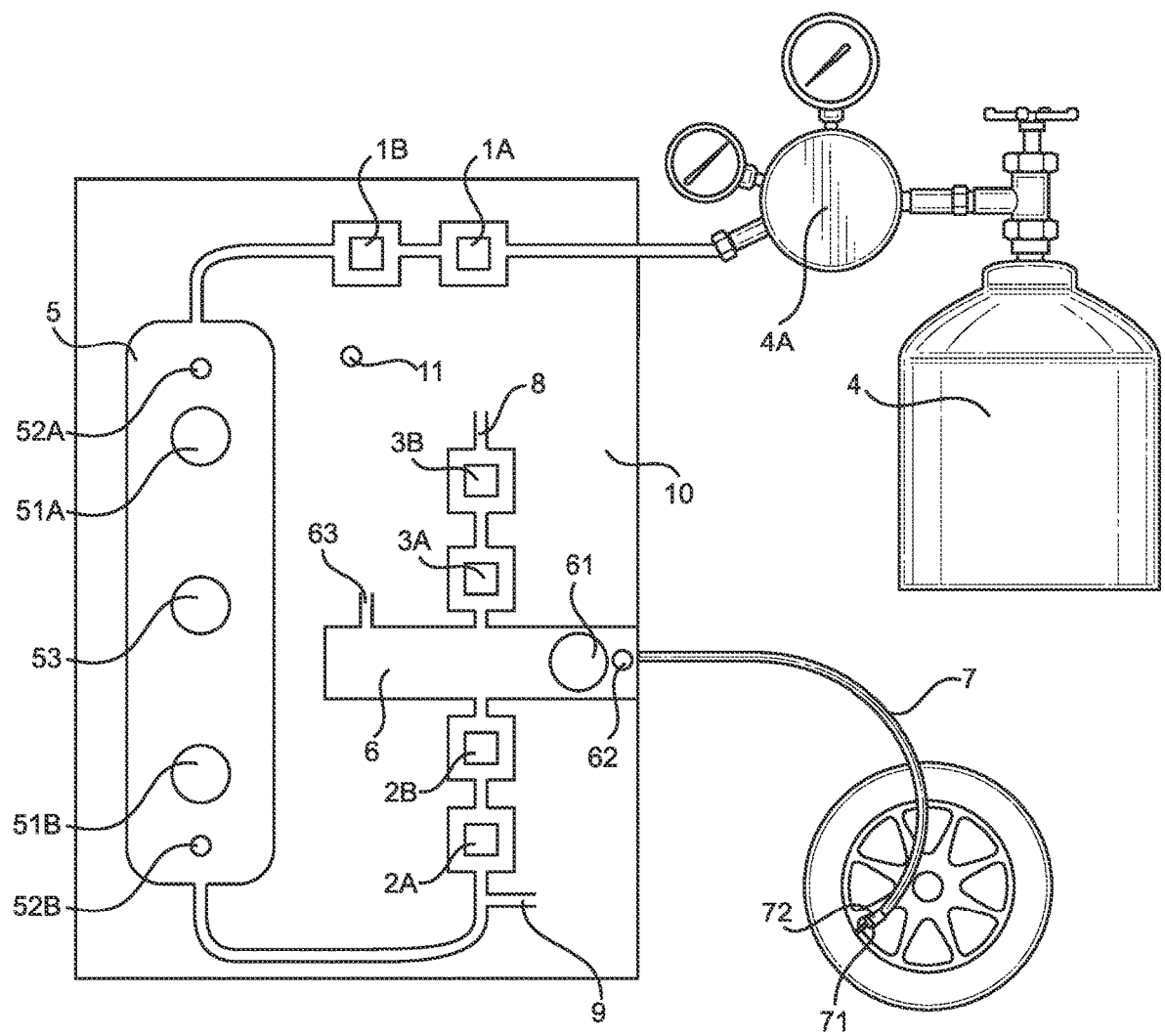
FIG. 1 is a schematic view an embodiment of the inflation apparatus.

Referring to FIG. 1, a basic embodiment of the air-flow control apparatus of the invention comprises a tank 4 that holds high pressure gas such as air or preferably nitrogen gas. In an embodiment, the tank 4 comprises multiple tanks joined by a manifold, so that an individual tank can be replaced without interrupting the overall function of the system. In an embodiment, the tank 4 is connected to a regulator 4a which limits the working pressure, such as for example limiting the pressure to 145 PSI, but the scope of the present disclosure is not limited in this respect. In some embodiments, the regulator 4a is connected to a controlling needle valve for fine adjustment. Other embodiments use solid state controls of air flow and do not have an adjusting needle valve, or may include a fixed orifice to limit gas flow.

The tank 4 is connected to a first inflation valve 1a that is in turn serially connected to a first safety valve 1b. The first inflation valve 1a and first safety valve 1b are connected to a measurement chamber 5. Although FIG. 1 shows first inflation valve 1a connected closer to the tank 4 and the first safety valve 1b connected closer to the measurement chamber 5, the invention is not limited to this arrangement and only requires that the first inflation valve 1a and first safety valve 1b are connected in serial between the tank 4 and the measurement chamber 5.

The measurement chamber 5 is an air chamber used to precisely measure the pressures from the tire as well as the inflator system. The measurement chamber 5 comprises a first pressure sensor 51a, and a calibration test port 53. In various embodiments, the measurement chamber 5 further comprises one or more of a second pressure sensor 51b, a first temperature sensor 52a and a second temperature sensor 52b. The pressure and temperature sensors each comprise a measurement end in communication with the interior of the measurement chamber 5 for determining gas pressure or temperature inside the measurement chamber 5, and an output end to the exterior of the measurement chamber 5 for communicating the measured pressure or temperature via an analog or digital signal. The calibration test port 53 is sealable port that permits access to pressure and/or temperature measurement of the interior of the measurement chamber 5 by calibrated measurement equipment. In an embodiment, the calibration test port 53 is connected to an NIST traceable certified pressure sensor to permit calibration of the pressure determination function of the first pressure sensor 51a, or of the combined first pressure sensor 51a and second pressure sensor 51b.

In the embodiment having the first pressure sensor 51a and second pressure sensor 51b, these dual pressure sensors increase accuracy by an averaging method and also act as a redundant safety check. In general, the temperature sensors are used to measure temperature of the filling gas or of the internal tire air when reading tire pressure. Temperature of the internal tire air is used to determine the deviation of the tire temperature from "cold" tire temperature. Since all manufacturer recommended tire pressures are provided as a pressure for a "cold" tire, if the internal tire air temperature is elevated above ambient environmental temperature due to recent use of the tire, the set pressure must compensate for the hot tire condition to result in the manufacturer recommended pressure when the tire returns to its cold baseline temperature.

The measurement chamber 5 is connected to a second inflation valve 2a that is in turn serially connected to a second safety valve 2b. The second inflation valve 2a and second safety valve 2b control gas communication between the measurement chamber 5 and a hose 7 via a relief valve manifold assembly 6, and thus the combined second inflation valve 2a and the second safety valve 2b serves as a tire isolation valve. Although FIG. 1 shows second inflation valve 2a connected closer to the measurement chamber 5 and the second safety valve 2b connected closer to the relief valve manifold assembly 6, the invention is not limited to this arrangement and only requires that the second inflation valve 2a and second safety valve 2b are connected in serial between the measurement chamber 5 and the relief valve manifold assembly 6.

The relief valve manifold assembly 6 can comprise a pressure relief safety valve 63 set to release gas pressure within the relief valve manifold assembly 6 in excess of a preset amount. For example, the pressure relief safety valve 63 can be set to automatically release gas pressure exceeding 145 PSI within the relief valve manifold assembly 6. In an embodiment, the relief valve manifold assembly 6 further comprises one or both of a third pressure sensor 61 and a third temperature sensor 62. The third pressure sensor and the third temperature sensors each comprise a measurement end in communication with the interior of the relief valve manifold assembly 6 for determining gas pressure or temperature inside the relief valve manifold assembly 6, and an output end to the exterior of the relief valve manifold assembly 6 for communicating the measured pressure or temperature via an analog or digital signal.

A deflation valve 3a and third safety valve 3b are connected in serial between the relief valve manifold assembly 6 and an open air release vent 8. Although FIG. 1 shows deflation valve 3a connected closer to the relief valve manifold assembly 6 and the third safety valve 3b connected closer to the open air release vent 8, the invention is not limited to this arrangement and only requires that the deflation valve 3a and third safety valve 3b are connected in serial between the relief valve manifold assembly 6 and the open air release vent 8.

In an embodiment, the open air release vent 8 further comprises an air-flow limiting orifice valve to decrease air flow by at least 20% to improve the precision and accuracy of the pressure setting inflation of the system. In an alternate embodiment, the third safety valve 3b comprises the air-flow limiting orifice, so the third safety valve 3b toggles between being fully open versus air-flow orifice limited. The air-flow limiting orifice valve is held open during initial inflation and deflation and then is closed on final measurement to achieve accurate set pressure value. The air-flow limiting orifice valve is also used to slowly lower tire pressure on deflation. Finally, the air-flow limiting orifice valve is used to slowly deflate the air pressure in the hose 7 to about 25% below the target tire pressure to ensure this hose pressure will not obfuscate an accurate initial tire pressure reading by inadvertently inflating the tire before the initial tire pressure reading is obtained.

In an embodiment, there is a second test port 9 disposed between the measurement chamber 5 on the one end, and the second inflation valve 2a and second safety valve 2b on the other end.

In an embodiment, some or all of the first inflation valve 1a, the first safety valve 1b, the measurement chamber 5, the second inflation valve 2a, the second safety valve 2b, the relief valve manifold assembly 6, the deflation valve 3a, the third safety valve 3b, and the open air release vent 8 are contained in a housing 10. The housing 10 optionally contains a fourth temperature sensor 11 which, in a further embodiment, is located on a heat sink plate inside of the housing 10.

The hose 7 extends from the relief valve manifold assembly 6 and comprises an air chuck 71 that engages with a tire stem valve to pressurize a tire. The hose 7 permits gas pressure communication between the tire interior and the measurement chamber 5 for accurate tire pressure determination. During tire inflation, compressed gas from the tank 4 passes through the first inflation valve 1a and the first safety valve 1b into the measurement chamber 5 for pressure determination during inflation, then through the second inflation valve 2a and second safety valve 2b, through the relief valve manifold assembly 6, through the hose 7 and into the tire. During tire deflation, gas from the tire passes from the tire through the hose 7 into the relief valve manifold assembly 6, and through the deflation valve 3a, third safety valve 3b, and the open air release vent 8.

In an embodiment, the hose 7 is an elastomeric hose, and the measurement chamber 5 is made of a high strength rigid material such as steel which will not expand when filled with the various operational gas pressures contemplated herein. The mating of these two dissimilar materials allows highly accurate measurement of both the pressure and temperature of the connected tire. The pressure measurement accuracy is improved by a relatively small volume of the measurement chamber 5 which is for example less than five percent of the tire volume. The elastomeric hose 7 expands and contracts to blunt pressure changes, eliminate pressure spikes and reduce pressure reverberations to permit the control system to rapidly measure pressure and responsively open or close values to achieve a set pressure to a high degree of precision in a rapid time frame.

In an embodiment, the hose 7 further comprises an air chuck temperature sensor 72 located at the air chuck 71 that measures the temperature of the air inside the air chuck 71 and hose 7. Thus, an embodiment of the system comprises five temperature sensors. The first temperature sensor 52a, second temperature sensor 52b, and third temperature sensor 62 each have their respective measurement end directly in contact with the tire air to ensure accurate tire air temperature reading. In an embodiment, the first temperature sensor 52a and the second temperature sensor 52b are thermocouple temperature sensors that are embedded into a high pressure sensing element in the measurement chamber 5 to assist in quickly and accurately measuring the proper temperature of the air inside the tire. The relatively small size of the measurement chamber 5 (e.g. 350 ml/42.5 L or approximately 1% to less than 5% of the tire volume) ensures that the measurement chamber 5 will more precisely reflect the actual temperature of the tire air.

The system is operated by a controller receiving the pressure and temperature analog or digital signals from the pressure sensors and temperature sensors, and controlling the opening and closing of the valves to pressurize the tire as detailed more fully herein. In an embodiment, the controller has a user interface through which a user enters the specified cold pressure of the tire manufacturer, or other desired pressure. In one embodiment, user payment can be accepted through insertion of cash or coins, and in a cashless-only embodiment, the user swipes a card, enters card information or uses Near Field Communication devices to make a cashless payment.

Figure 2:
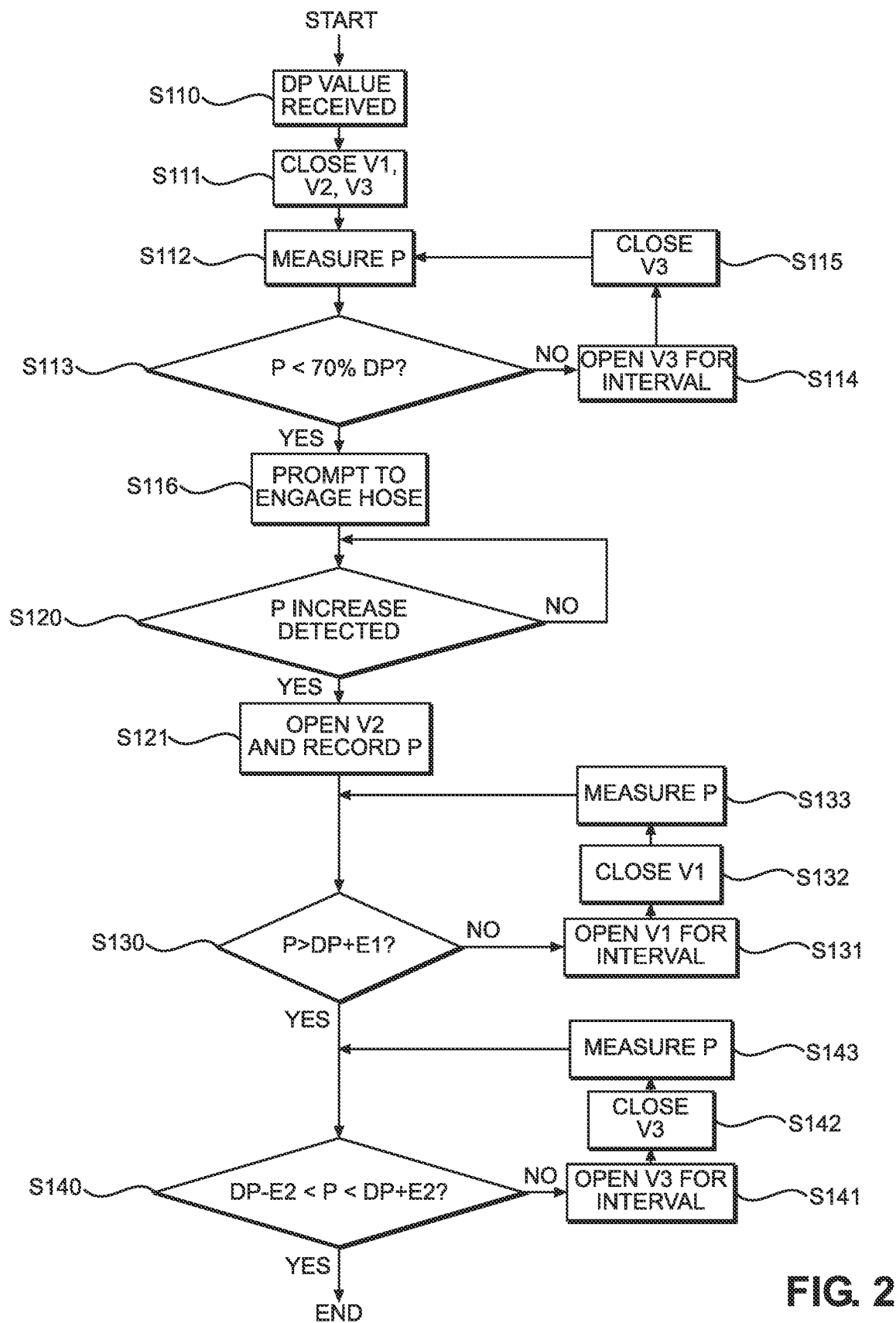
FIG. 2 is a flowchart of the inflation method.

Referring to FIG. 2, after starting an inflation routine through user entry and payment or otherwise, the controller receives a desired pressure (DP) in step S110. The desired pressure (DP) can be manually entered, retrieved from a database, and/or calculated, such as from a tire manufacturer cold pressure converted to the corresponding desired pressure (DP) at the current non-cold temperature of the tire to be inflated. At step S111, the controller closes the first inflation valve 1a (V1), the second inflation valve 2a (V2), and the deflation valve 3a (V3).

After the desired pressure (DP) is received by the controller and all valves are closed, the system depressurizes the hose in one or more cycles comprising steps S112, S113, S114, and S115. At step S112, the controller measures the pressure in the hose 7 and relief valve manifold assembly 6 using the third pressure sensor 61. At step S113, the controller determines whether the pressure in the hose 7 and relief valve manifold assembly 6 is less than a predetermined percentage such as 70% of the desired pressure (DP). If not, the method proceeds to step S114. At step S114, the controller opens the deflation valve 3a (V3) for a time interval. Reference to "time intervals" in this disclosure means, for a first time interval of a given loop of inflation or deflation cycles, a length of time predetermined through routine testing to result in an inflation or deflation that will not overshoot the endpoint pressure for ending the loop. After the first such time interval for a given loop, "time interval" means a length of time calculated by the controller, according to actual measured changes in pressure that resulted from one or more previous time intervals, to advance the inflation or deflation some predetermined percentage toward the endpoint pressure for ending the loop. At step S115, the controller closes deflation valve 3a (V3). The method then repeats from step S112 to again measure the pressure in the hose 7 and relief valve manifold assembly 6 using the third pressure sensor 61. When the controller determines that this pressure is now less than the predetermined percentage of the desired pressure (DP), the method exits the hose depressurization loop and proceeds to step S116, where the controller prompts the user to engage the air chuck 71 of the hose 7 to the tire stem valve of the tire. In other embodiments, such engagement is automated and therefore such prompting is not required.

At step S120, the system waits until a connection of the hose 7 to the tire through a detected rise in pressure at the third pressure sensor 61. Upon connection with the tire, the system proceeds record the temperature from the air chuck temperature sensor 72 and opens all safety valves 1b, 2b and 3b for further operation. Thereafter at step S121, the second inflation valve 2a (V2) is opened to allow the air pressure from the tire to fill the measurement chamber 5. The first pressure sensor 51a then reads the pressure (P) inside measurement chamber 5 and reports this pressure to the controller. In an embodiment, the second pressure sensor 51b also reads the pressure (P) inside measurement chamber 5 and reports this pressure to the controller, and the controller averages the pressure value from the first pressure sensor 51a and the second pressure sensor 51b. The first temperature sensor 52a reads the air temperature inside the measurement chamber 5 and reports this pressure to the controller. In an embodiment, the second temperature sensor

52b also reads the air temperature inside the measurement chamber 5 and reports this temperature to the controller, and the controller averages the temperature values from the first temperature sensor 52a and the second temperature sensor 52b. In an embodiment, the controller converts pressures determined by the methods above to calibrated pressures using a calibration curve determined according to a calibration process described below.

The system now begins to inflate the tire in one or more inflation cycles comprising steps S130, S131, S132, and S133. At step S130, if the pressure (P) inside measurement chamber 5 is not greater than the desired pressure (DP) plus some predetermined over-inflation amount (E1), the system loops through steps S131, S132, and S133. In step S131 the first inflation valve 1a (V1) is opened for a time interval calculated to inflate the tire to a target pressure based on the differential pressure between the tank 4 and the tire. The first inflation valve 1a (V1) is thereafter closed in step S132. In step S133, the pressure (P) inside the measurement chamber 5 is remeasured, and the process returns to step S130. In an embodiment, predetermined over-inflation pressure (DP+E1) is approximately 1% above the desired pressure (DP). In an embodiment, tire inflation to the desired pressure (DP) or predetermined over-inflation pressure (DP+E1) is accomplished in multiple cycles of timed filling to intermediate target pressures and subsequent pressure measurement for fine tuning of the filing time of subsequent cycles. This inflation cycle repeats until pressure (P) inside measurement chamber 5 is greater that the predetermined over-inflation pressure (DP+E1). Upon reaching the desired pressure (DP) or predetermined over-inflation pressure (DP+E1), the first inflation valve 1a (V1) is closed, while the second inflation valve 2a (V2) remains open. In the embodiment where the tire is inflated to the predetermined over-inflation pressure (DP+E1), the deflation valve 3a (V3) is then opened on a timed basis to deflate the pressure (P) inside measurement chamber 5 from the over-inflation pressure (DP+E1) to the desired pressure (DP). In an embodiment, tire deflation from the over-inflation pressure (DP+E1) to the desired pressure (DP) is accomplished in multiple cycles of timed deflation through the air-flow limiting orifice valve and subsequent measurement of the pressure (P) inside measurement chamber 5 for fine tuning of the deflation time of subsequent cycles, at which time the system then enters a set of deflation cycles comprising steps S140, S141, S142 and S143.

In step S140, the controller determines whether the pressure (P) inside measurement chamber 5 is within a predetermined variance (E2) of the desired pressure (DP). If not, the controller proceeds to step S141 to open the deflation valve 3a (V3) for a predetermined time interval. Then the controller closes the deflation valve 3a (V3) in step S142 and measures the pressure (P) inside measurement chamber 5 in step S143 before returning to step S140. When the pressure (P) inside measurement chamber 5 is within a predetermined variance (E2) of the desired pressure (DP), the process concludes.

Upon completion of the tire inflation process the new tire pressure value is recorded.

If the controller determines that tire deflation is required after measuring the pressure (P) and temperature inside measurement chamber 5 in step S121, the deflation valve 3a (V3) is opened for a period of time calculated to deflate the tire to a target pressure. In an embodiment, tire deflation to the desired pressure (DP) is accomplished in multiple cycles of timed opening of the deflation valve 3a (V3) to intermediate target pressures and subsequent pressure measurement for fine tuning of the deflation time of subsequent cycles.

Upon reaching the target pressure, the deflation valve 3a (V3) is closed, while the second inflation valve 2a (V2) remains open. In an embodiment, the final deflation cycles are effectuated by the air-flow limiting orifice valve. Upon completion of the tire deflation process the new tire pressure value is recorded.

In an embodiment, the above inflation or deflation process is repeated for all tires of a vehicle, after which the system optionally prints or emails a certified pressure statement and receipt ticket including such data as estimated fuel savings, and sends all collected data to a centralized database for record, including without limitation prior existing tire pressures, new set tire pressures, how underinflated the tires previous condition was, and how much fuel economy and dollar savings will be realized due to the proper inflation of tires, customer data, vehicle data, and tire identification data. In an embodiment, the receipt can provide a coupon for a free cup of coffee or similar incentive for the user to enter the associated retail establishment as a means of promoting user patronage.

In an embodiment, calibration of the system is performed using certified test equipment communicating with the interior of the measurement chamber 5 via the calibration test port 53. Specifically, certified test equipment such as a certified pressure sensor traceable to the National Institute of Standards and Technology is coupled to the calibration test port 53 and a calibration sequence is performed as described below, wherein the values are for example only and do not limit the invention.

In an embodiment, the calibration process is performed as follows. The second inflation valve 2a is left open, the deflation valve 3a is closed, and the first inflation valve 1a is opened for an estimated time interval predetermined to cause the air pressure within the measurement chamber the relief valve manifold assembly 6, and the hose 7 to increase by 10 PSI. After the estimated time interval, the first inflation valve 1a is closed and the actual pressure inside the measurement chamber 5 determined by certified test equipment is recorded along with the pressure determined by the first pressure sensor 51a, or both the first pressure sensor 51a and the second pressure sensor 51b. The system then adjusts the estimated time interval to arrive closer to an actual 10 PSI increase in pressure on the next cycle, and these cycles of fill, test, and tune are repeated until the pressure inside the measurement chamber 5 reaches or exceeds 145 PSI. At this point, a cyclic deflation process is performed. The first inflation valve 1a remains closed, and the second inflation valve 2a is opened. Thereafter, the deflation valve 3a is opened for an estimated time interval predetermined to cause the air pressure within the measurement chamber 5 to decrease by 10 PSI. After the estimated time interval, the deflation valve 3a is closed and the actual pressure inside the measurement chamber 5 determined by certified test equipment is recorded along with the pressure determined by the first pressure sensor 51a, or both the first pressure sensor 51a and the second pressure sensor 51b. The system then adjusts the estimated time interval to arrive closer to an actual 10 PSI decrease in pressure on the next cycle, and these cycles of deflate, test, and tune are repeated until the pressure inside the measurement chamber 5 reaches the initial baseline atmospheric pressure. The recorded pressures are used to create a polynomial calibration curve used determine the certified pressure reading that corresponds to actual readings by the first pressure sensor 51a, or an average pressure reading from the first pressure sensor 51a and the second pressure sensor 51b.

Figure 3:
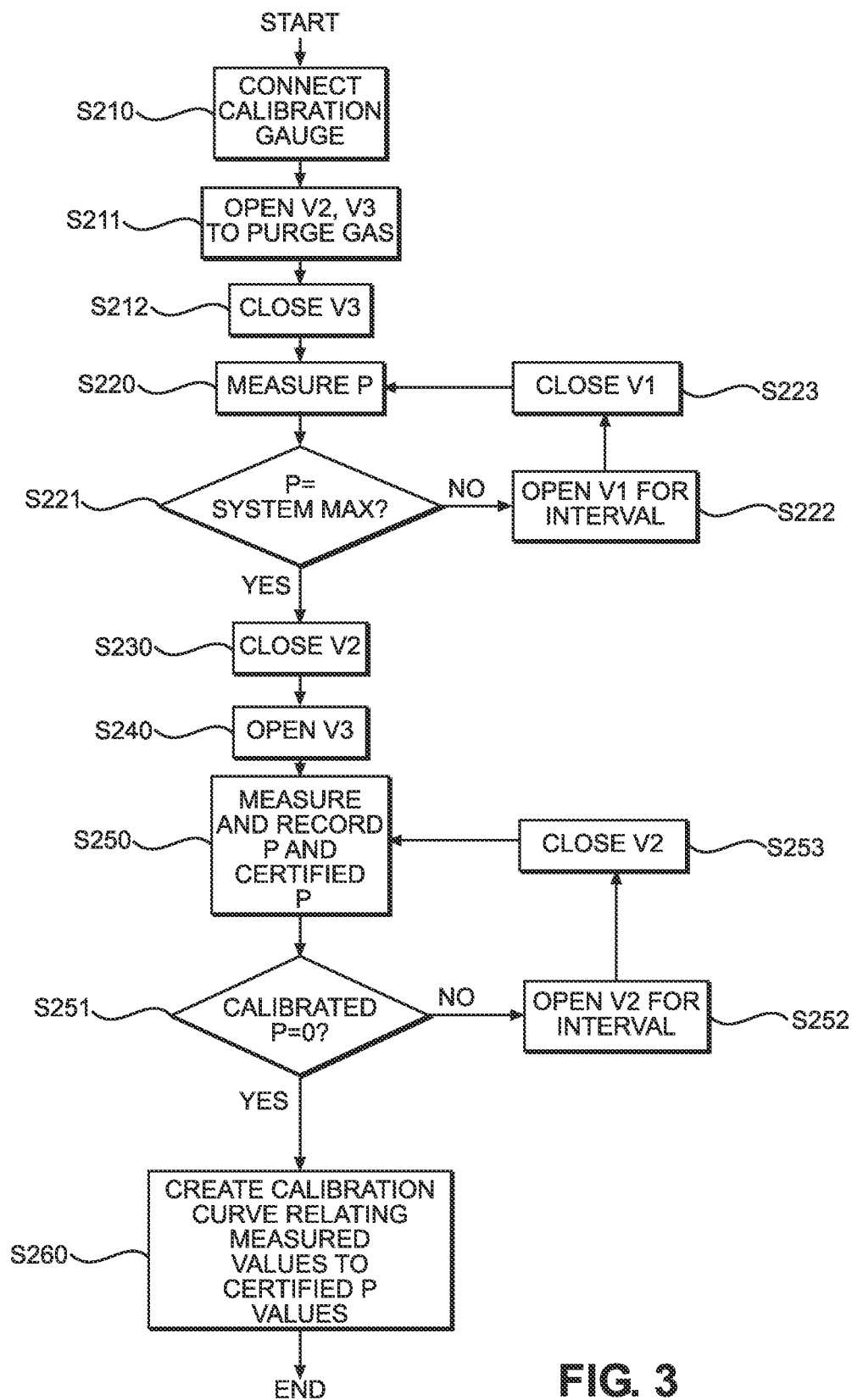
FIG. 3 is a flowchart of the calibration method.

FIG. 3 shows an embodiment of the process for calibrating the system. In step S210, a certified pressure sensor traceable to the National Institute of Standards and Technology is installed in calibration test port 53. In step S211, the controller opens the second inflation valve 2a (V2) and the deflation valve 3a (V3) to reduce gas pressure in the measurement chamber 5 to atmospheric pressure, and then closes the deflation valve 3a (V3) in step S212.

The calibration process then increases pressure in the measurement chamber 5 to a predetermined system maximum pressure in cycles comprising steps S220, S221, S222 and S223. For example, the predetermined system maximum pressure can be set at 145 PSI, and is configured to be the top of the range of operational pressures to be measured by the apparatus. In step S220, the controller measures the pressure (P) inside measurement chamber 5, as described previously. In step S221, the controller determines whether the pressure (P) inside measurement chamber 5 has reached the predetermined system maximum pressure. If not, the calibration process proceeds to step S222. In step S222, the first inflation valve 1a (V1) is opened for a time interval, and closed in step S223. Thereafter steps S220 and S221 are repeated.

Reference to "time intervals" in the context of the calibration process indicates a length of time predetermined through routine testing to result in an inflation or deflation that will increase or reduce the pressure in in measurement chamber 5 by an integer divisor. This time interval can be adjusted based upon the results of the prior cycle. For example, if the predetermined system maximum pressure is 145 PSI, and the calibration cycle calls for 15 measurements to cover the entire range of pressures from the predetermined system maximum pressure down to 0 PSI above ambient atmospheric pressure, then each time interval is an amount of time required to open the deflation valve 3a (V3) to reduce the pressure by $\frac{1}{15}^{th}$ of the range between 145 PSA and 0 PSI.

When the controller determines that the pressure (P) inside measurement chamber 5 has reached the predetermined system maximum pressure in step S221, the process continues to step S230, wherein the second inflation valve 2a (V2) is closed. In the subsequent step S240, the deflation valve 3a (V3) is opened.

The calibration process then deflates pressure in the measurement chamber 5 from the predetermined system maximum pressure to the minimum (ambient atmospheric) pressure in a predetermined number of intervals, using cycles comprising steps S250, S251, S252 and S253. In step S250, the controller records the pressure in measurement chamber 5, both by: (1) the measured pressure determined the first pressure sensor 51a or the first pressure sensor 51a and second pressure sensor 51b, and (2) the certified pressure determined by the certified test equipment. In step S251, the controller determines whether the certified pressure is down to ambient atmospheric pressure (0 PSI). If not, step S252 is performed to open the second inflation valve 2a (V2), and step S253 is performed to close the second inflation valve 2a (V2).

When the controller determines that the certified pressure is down to ambient atmospheric pressure (0 PSI), the controller performs step S260. In step S260, the controller uses the recorded measured pressures and their corresponding certified pressures to create a calibration curve relating the measured pressure values to certified pressure values.

Figure 4:
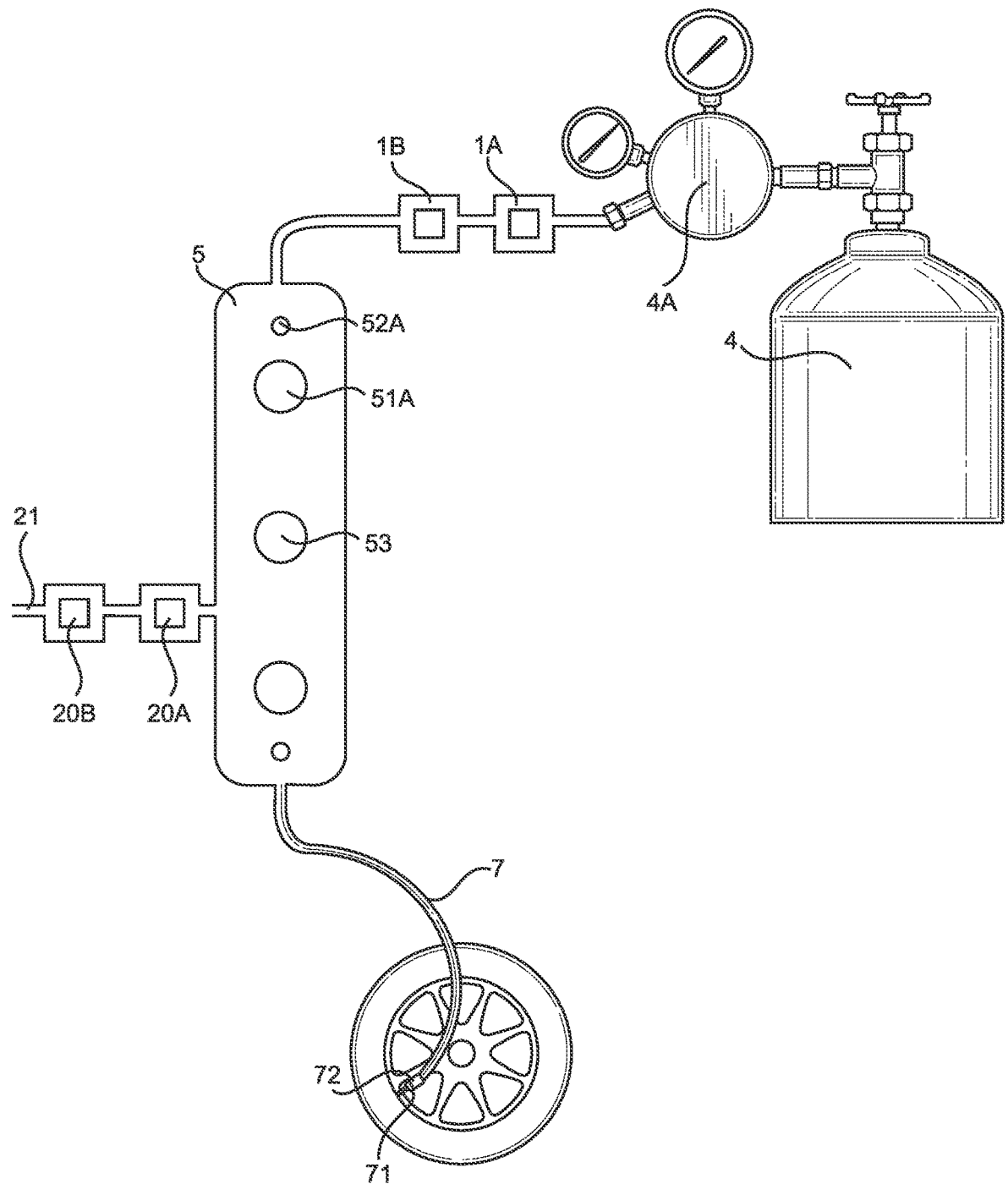
FIG. 4 is a schematic view of another embodiment of the inflation apparatus.

FIG. 4 shows a simplified embodiment of the invention as compared to FIG. 1. In FIG. 4, the functions of the deflation valve 3a, the third safety valve 3b, and open air release vent 8 are performed by a deflation valve 20a, a third safety valve 20b, and an open air release vent 21, that are disposed on the measurement chamber 5 to be directly in fluid communication with the interior of the measurement chamber 5. In this embodiment, the hose 7 extends directly from the output port of the measurement chamber 5 so that the relief valve manifold assembly 6 is eliminated. The process of the embodiment of FIG. 4 is substantially the same as the process of FIG. 1 described above with reference to FIG. 2, except that step S121, is replaced by simply engaging the air chuck 71 to the tire stem to allow the air pressure from the tire to fill the measurement chamber 5. Likewise, process of calibrations of the embodiment of FIG. 4 is substantially the same as the process of FIG. 3 described above with reference to FIG. 1, except that the deflationary cycles are controlled by the deflation valve 20a (becomes V2 in FIG. 4) rather than the second inflation valve 2a (V2). Specifically, for the calibration of the embodiment of FIG. 4, the deflation valve 20a (V2) is closed at step S230, step S240 is eliminated, and steps S252 and S253 open and close the deflation valve 20a (V2), respectively, rather than the second inflation valve 2a (V2).

Figure 5:
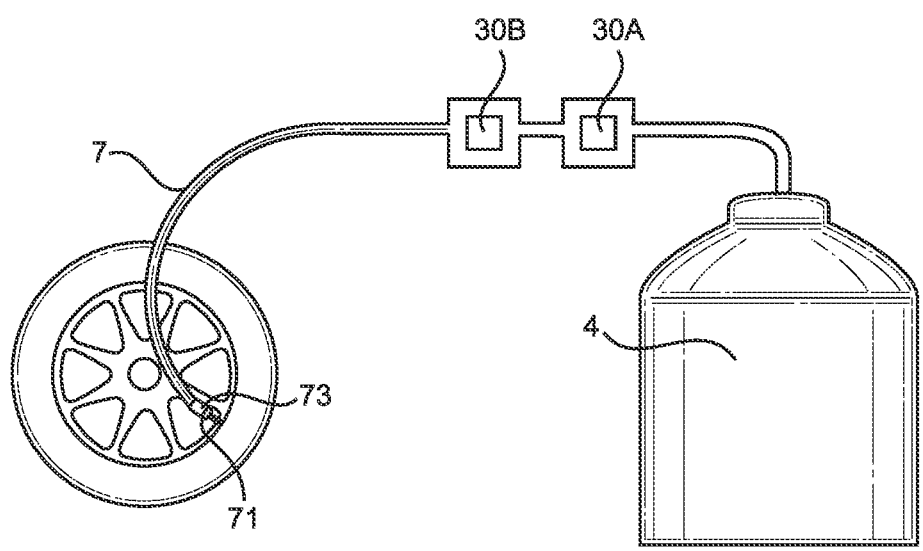
FIG. 5 is a schematic view of another embodiment of the inflation apparatus.

FIG. 5 shows another embodiment of the invention that uses a serial tandem valve assembly that acts as a valve with a closing speed that is faster than possible with a single valve. The speed of the serial tandem valve assembly enables extremely rapid yet accurate inflation of a tire from a high-pressure compressed gas tank without a regulator, as shown in FIG. 5. FIG. 5 shows a first inflation valve 30A and a second inflation valve 30B connected between the tank 4 of compressed gas and hose 7 leading to the air chuck 71 and sensor 73. The sensor 73 can be a pressure sensor, or a combined pressure and temperature sensor. Although not shown, this embodiment can also comprise another pressure sensor between the tank and inflation valves 30A and 30B to measure pressure of the tank 4.

The embodiment of FIG. 5 is operated by a controller that sequentially performs the following steps: (1) closing the first inflation valve 30A and opening the second inflation valve 30B, (2) reading the gas pressure determined by the sensor 73 as an initial pressure when the air chuck 71 engages a tire and thereby permits inflation communication between the interior of the tire and the sensor 73, (3) sending an opening signal to open the first inflation valve 30A, (4) waiting for a time, the length of which is calculated to cause the gas pressure within the tire to increase to a desired pressure according to a tank pressure in the tank 4, the initial pressure in the tire, and a known delay between sending a closing signal to the second valve 30B and the second valve 30B fully closing, and (5) immediately sending the closing signal to the second valve 30B after waiting for this calculated time period. Through this process, the second valve 30B can shut before the first valve 30A would be physically capable of shutting. This fine-grained control over the time which the high pressure of the tank 4 is exposed to the tire enables accurate regulator-free inflation at an extremely rapid rate unrestricted by the physical limitations of opening and closing of each individual valve.

In certain embodiments, the apparatus includes an internal microphone which is used as a failure detection device by monitoring the sound of the inflation or deflation sequence, and notifying of any detected abnormalities.

In an embodiment the inflation system can be integrated with a user interface in a standalone, self-service kiosk for servicing automobiles, trucks, buses, motorcycles, scooters bicycles, trailers, aircraft, military vehicles, wheelbarrows, and removed wheel-tire assemblies or tubes of the above, as well as inflatable balls, floatation devices and other recreational equipment. The kiosk can be fitted to accept cash and coin payment, or preferably can be a cashless system that accepts EMV chip payment cards, magnetic swipe payment cards and Near-Field-Communication (NFC) payment systems like Apple Pay®. Optionally, the user can install a custom smartphone application to bypass the card swipe process and directly pay as part of user profile through the application. Payment can include a method of EMV secure credit card purchase with token key to provide real time customer information from a remotely located and networked database without providing customer credit card number of other vital information which could compromise the credit card transaction. The method can thereby identify the customer and preset the device to allow faster service, enable subscription-based payment plans, and promote customer loyalty.

The kiosk can be equipped with a receipt printer to print a certified pressure statement, receipt, and promotional material and it can be networked to email fuel savings or other results to the user. The receipt can identify the initial under-inflation values, post-inflation values, and estimated fuel savings. These printed receipts may contain promotional material for the retail establishment hosting the kiosk, such as a coupon to promote user patronage to the retail establishment.

The kiosk embodiment can be equipped with video and or loudspeaker functionality to guide the user to engage the air chuck to specific tires on the vehicle for tire-specific record keeping. The loudspeaker can also announce beneficial features of proper tire maintenance, warn of an impending tire failure, inform of a recent tire recall, advise of a vehicle malfunction that might adversely increase pollution emissions or cause some other adverse environmental impact. The system may also use a microphone for two-way communications and takes advantage of the relative quiet operation of a compressed gas system as compared to standard air-compressor based systems.

Figure 6:
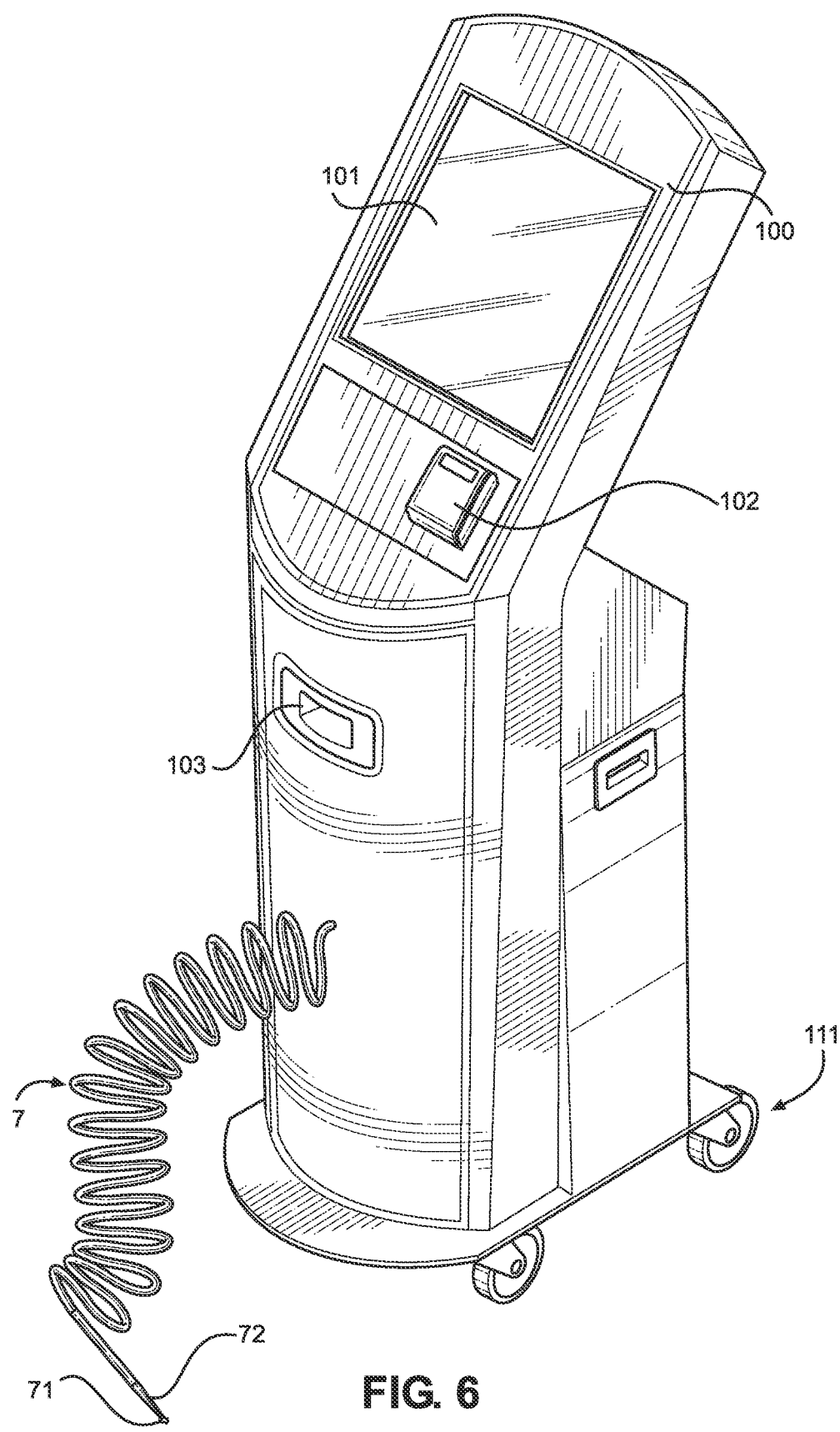
FIG. 6 is a perspective view of the kiosk embodiment of the apparatus.

FIG. 6 shows is a perspective view of the kiosk embodiment of the apparatus. In various embodiments, the kiosk containing the apparatus and controller of the invention can have one or more of a kiosk cabinet 100 to contain the components described above, a display screen 101, which can optionally be a touchscreen for use as an user input-output device, a reader 102 which can be a magnetic strip, payment card chip, or near-field communications reader for interfacing cashless payment options, and a receipt printer 103 for optionally outputting a certified pressure statement, a receipt, and proportional coupons. The kiosk can be optionally mounted on wheels 111 for easier mobility.

Figure 7:
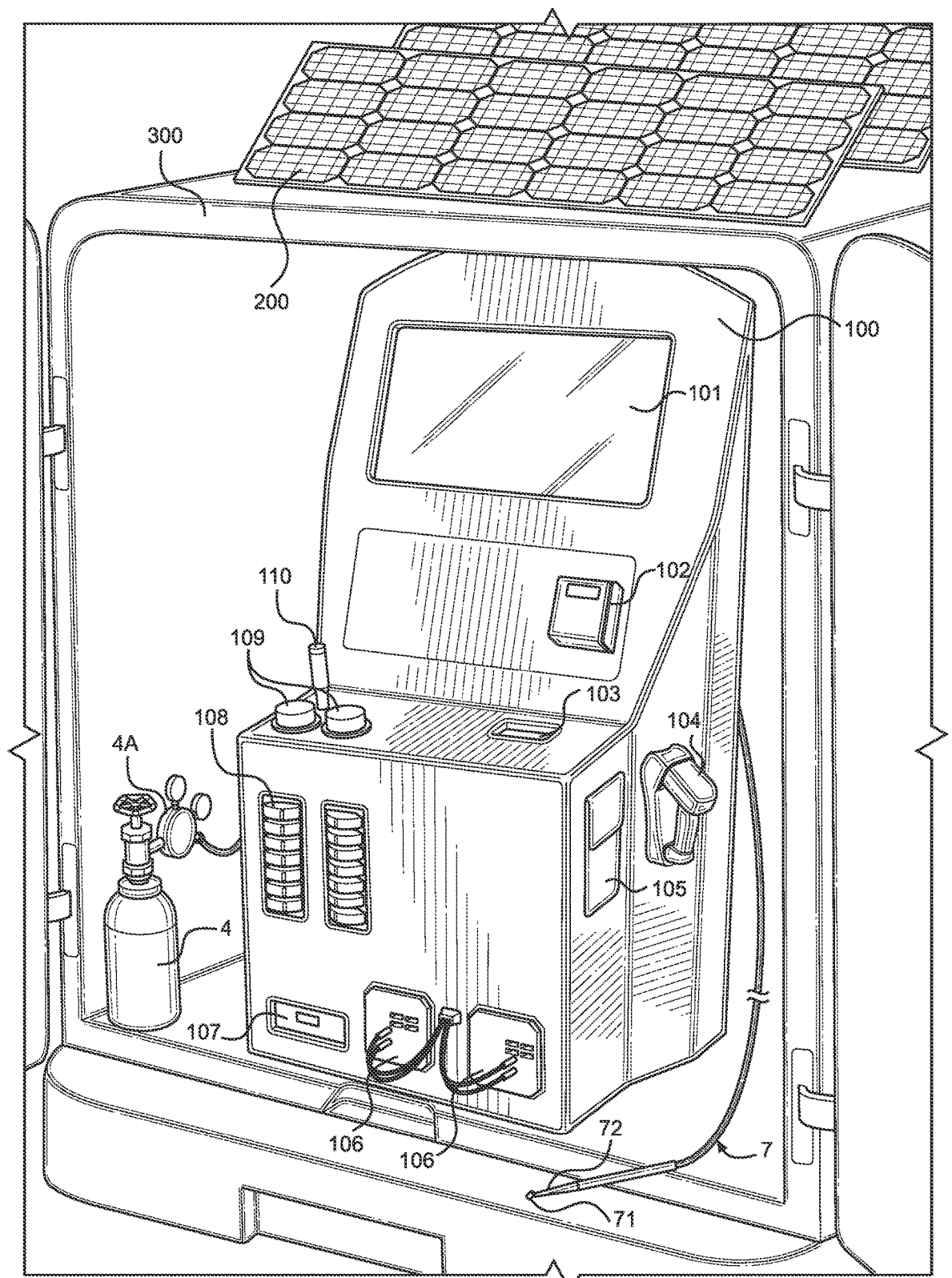
FIG. 7 is a perspective view of the mobile service vehicle ("miosk") embodiment of the apparatus.

FIG. 7 shows a perspective view of the mobile service vehicle ("miosk") embodiment of the apparatus, where the apparatus is in a vehicle for driveway and fleet parking lot service. In addition to the optional features of the kiosk of FIG. 6 discussed above, the miosk embodiment can have one or more of: a tire thread depth gauge 105, an uninterruptable power supply 106, a vehicle battery charger 107, a switch control panel 108, a supply of tire stem caps 109, and a tire valve removal tool 110. Finally, the vehicle can have solar panels 200 on top, helping to power the apparatus and recharge the vehicle batteries.

The system, as the kiosk, mobile service, or otherwise, can serve as the central data collection apparatus for a tire inspection and maintenance service. In addition to pre- and post-inflation pressures, temperatures, and installation location of the tire on the vehicle, the system can be used to record technician inspection results regarding individual tire tread wear depths and patterns, sidewall conditions, indications of flat-spotting, evidence of actual or pending puncture or other abnormal condition or defect, and identification of manufacturer, model, serial number and manufacture date of the tire.

The system can be connected through a computer network to a file server using a wired or wireless connection. The connection to the file server can be through a secure virtual private network. In an embodiment, the system can includes a series of cameras and audio and video to record additional images of the tires that are being filled as well as to improve the user experience.

The system optionally contains the ability to connect with the Electronic Control Module, vehicle On-Board Diagnostics information, as well other computer systems of the vehicle and allow the system to capture operating information about the user's automobile from the onboard electronic car operational systems, or through manual entry of data such as odometer readings. Thus, if the user vehicle has a "check engine" warning light on, the system can record this condition and then the central server will include this information in the database of information relating to this user or customer. The system can barcode scan, query the vehicle computer system, or otherwise accept entry of the Vehicle Identification Number, license plate, or other identifying information for recording and querying a database regarding recall notices or other vehicle-specific of tire-specific information of value to the vehicle owner.

The tire-specific data collection can be used to evaluate tire performance and leak data to provide predictive indication of tire failure including dangerous tire-blowouts. It can be used to measure de facto historical vehicle load conditions including center of gravity as well as occupant and transported payloads including impacts on tires. By calculating the actual center of gravity in a loaded vehicle condition, each individual tire pressure can accordingly adjusted to extend tire life and eliminate the need for tire rotation. Such individual tire pressure optimization can also incorporate tire tread wear patterns to compensate for abnormal tear wear thereby promoting longer tire life. The certified tire pressure statements generated by the system also provide evidence of calibrated tire pressures over a range of dates as evidence of tire maintenance for legal and insurance purposes, such as in the event of dispute over liability.

In another example, the data can be used to evaluate stationary vehicle tire conditions and to prevent flat-spotting from limited use and rarely moved vehicles such as car lot and fleet vehicles which may suffer adverse tire conditions from unusual leak rates relating to the vehicle's stationary status. Recent trends in vehicle light-weighting and tire design requirements have created an increased awareness to tire flat-spotting. Tire flat-spotting occurs when tires remain in a loaded condition without rolling for an extended period of time. Tire flat-spotting can either be temporary or permanent depending on the length of storage and other environmental factors. Tire non-uniformity due to flat spots often induces shake and shimmy (back and forth oscillation of steering wheel) vibration in vehicles due to increased tire-wheel force variation input into the chassis. This can result in increased warranty costs for original equipment manufacturers as well as customer dissatisfaction exhibited in third party quality surveys like the annual J. D. Power Initial Quality Survey. While tire flat-spotting can also occur during the vehicle shipping process, it is particularly of concern for slow moving vehicle inventory that remains at manufacturing plants and/or dealership parking lots for extended periods of time.

The vehicle-specific data collection can be used, for example, for tracking of uneven tread wear over multiple visits to indicate suspension issues or indicate a state of de facto under-inflation and over-inflation despite regular pressurizing to manufacturer specifications. In such a scenario, the system can recommend customized pressures that deviate from manufacturer recommendations to compensate for the real-world wear of each individual tire on a vehicle. The data can also can be used for predicting automotive problems and recommending preventative maintenance accordingly. For example, the system can identify a potential wheel or brake failure problem from reading abnormally increased tire temperatures and warn of potential mechanical failure. The system can then provide a customizable receipt which can promote reduced cost services specific to the user and may advise the user of vendors from whom to get the proper service. The data can also be used to provide characteristics of road conditions for which the vehicle has traveled and the extent to which road repairs may be required because of potholes or uneven or bumpy roads.

The aggregate data collection enables analysis for improvement of inflation algorithms over time. For example, by recording all known variables regarding each inflation process including inflation apparatus-specific variables, the algorithms for inflation can be improved for greater accuracy and speed of inflation. Such algorithmic improvement can be effectuated through statistical means such as multivariate regression analysis, or through unsupervised artificial intelligence methods like deep learning neural network methodology leveraging the amassed data for model training. Similar algorithm improvement can be achieved for estimating tire wear fuel economy by reading, recording, and analyzing tire tread depth, fuel tank quantity and odometer mileage readings over time. Through such improved models, the system can predict the aggregate fuel and tire wear savings resulting from the underinflated tire problem on a regional or global basis to estimate the environmental and economic impacts accordingly. The system can be used to accumulate the total fuel savings and also compute the reduced carbon dioxide emission into the atmosphere from using the devices. This savings in carbon dioxide emissions could then be used to determine carbon credits attributable to use of the device. The aggregate data collection can be used to gather global statistics on tire wear conditions and driving patterns of manned and autonomous vehicles for the evaluation and analysis of driver ability as well as vehicle operational data which impacts tire wear, to determine the most effective tire package for certain vehicles, geographic locations and drivers.

The system optionally has the ability to email the user and recommend or remind the user that is time for a return visit to get tire inflation maintenance. Since all tires lose air over time, the present system can determine the rate of deflation of a given tire between uses of the system and then provide an email recommendation to the user on when to return for proper inflation services. Notices can also be sent for all new tire- or vehicle-related recall or other important notices.

In summary, the system permits rapid, quiet, safe and accurate tire pressure maintenance to pressures not reasonably attainable by standard compressor-based systems. The system is networked to database results of each visit to streamline subsequent visits and make recommendations based on patterns detected over time.

What is claimed is:

1. A method for pressurizing a tire, comprising:
    closing a first valve located along a conduit between a fluid source and a pressure sensor;
    opening a second valve located along the conduit between the first valve and the pressure sensor;
    receiving a pressure measurement from the pressure sensor, the pressure measurement including an initial pressure in response to an end portion of the conduit being fluidically coupled to an interior of the tire;
    sending an opening signal to open the first valve;
    waiting for a time period based on a pressure of the fluid source, the initial pressure, and a known delay between sending a closing signal to the second valve and the second valve fully closing; and
    sending the closing signal to the second valve after waiting for the time period.

2. A method for pressurizing a plurality of tires on a vehicle, comprising: calculating, via a microprocessor of an inflation system, a center of gravity of the vehicle in a loaded condition; producing an optimized tire pressure range for each tire of the plurality of tires based on a nominal tire pressure and the center of gravity; receiving a pressure measurement from a pressure sensor fluidically coupled to one or more of the plurality of tires, the pressure measurement including an initial pressure of one or more of the plurality of tires; and opening a first valve located along a conduit between a fluid source and the one or more of the plurality tires to convey a fluid into or out of the one or more of the plurality of tires such that a final pressure of the one or more of the plurality of tires is the optimized tire pressure range calculated for the one or more of the plurality of tires, including waiting for a time period based on a pressure of the fluid source, the initial pressure, and a delay between sending a closing signal to a second valve operatively coupled to the first valve and the pressure sensor and the second valve closing.

3. The method of claim 2, wherein opening the first valve location along the conduit between the fluid source and the one or more of the plurality of tires further comprises individually adjusting tire pressure of one or more of the plurality of tires.

4. The method of claim 3, wherein individually adjusting tire pressure of one or more of the plurality of tires further comprises incorporating a tire tread wear pattern.

5. The method of claim 2, wherein producing an optimized tire pressure range for the one or more of the plurality of tires based on a nominal tire pressure and the center of gravity includes customized pressures for one or more of the plurality of tires.

6. The method of claim 5, wherein calculating, via the microprocessor of the inflation system, includes analyzing vehicle operational data.

7. The method of claim 2, wherein the fluid source includes a fluid comprising nitrogen gas.

8. The method of claim 2, wherein the fluid source includes a fluid comprising a gas.

9. The method of claim 2, further comprising identifying a potential failure problem from reading one or more abnormally increased tire temperatures.

10. The method of claim 9, wherein reading one or more abnormally increased tire temperatures further comprises issuing a warning of the identified potential failure.

11. The method of claim 10, wherein the potential failure includes one or more of wheel failure, brake failure, and tire-blowout.

12. The method of claim 9, wherein the identified potential failure problem includes a suspension issue, under-inflation, or over-inflation.

13. The method of claim 9, wherein the identified potential failure problem includes tracking uneven tread wear, and further comprising recommending a customized pressure in one or more of the tires to compensate for the uneven tread wear.

14. The method of claim 9, further comprising predicting one or more automotive problems responsive to the identified potential failure problem, and recommending preventative maintenance.

* * * * *